United States Patent
Yamaguchi (10) Patent No.: US 8,967,921 B2
(45) Date of Patent: Mar. 3, 2015

(54) CUTTING INSERT AND CUTTING TOOL (75) Inventor: Takashi Yamaguchi, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 283 days.

(21) Appl. No.: 13/569,838

(22) Filed: Aug. 8, 2012

(65) Prior Publication Data

US 2012/0301234 A1 Nov. 29, 2012

Related U.S. Application Data

(63) Continuation-in-part of application No. PCT/JP2010/055959, filed on Mar. 31, 2010.

(51) Int. Cl.
| | |
|---|---|
| *B23B 27/16* | (2006.01) |
| *B23B 51/04* | (2006.01) |
| *B23B 27/00* | (2006.01) |
| *B23B 27/14* | (2006.01) |
| *B23C 5/20* | (2006.01) |

(52) U.S. Cl.
CPC .............. *B23B 51/048* (2013.01); *B23B 27/007* (2013.01); *B23B 27/141* (2013.01); *B23B 2200/125* (2013.01); *B23B 2200/321* (2013.01); *B23B 2200/0471* (2013.01)
USPC .................. 407/113; 407/33; 407/66; 407/42

(58) Field of Classification Search
USPC .......................... 407/113, 114, 115, 33, 42, 66
See application file for complete search history.

(56) References Cited

U.S. PATENT DOCUMENTS

| | | | |
|---|---|---|---|
| 4,072,438 A | | 2/1978 | Powers |
| 4,074,949 A | | 2/1978 | Hochmuth et al. |
| 4,411,565 A | * | 10/1983 | Hazra et al. ................... 407/114 |
| 4,844,669 A | * | 7/1989 | Tsujimura et al. ............ 408/188 |
| 5,032,050 A | * | 7/1991 | Niebauer et al. .............. 407/114 |
| 5,207,538 A | * | 5/1993 | Satran ........................... 407/113 |
| 5,437,522 A | * | 8/1995 | Satran et al. .................... 407/42 |
| 6,044,920 A | * | 4/2000 | Massa et al. .................. 175/417 |
| 6,224,300 B1 | * | 5/2001 | Baxivanelis et al. .......... 407/114 |
| 6,877,935 B2 | * | 4/2005 | Schlemmer et al. ............ 407/66 |
| 6,948,891 B2 | | 9/2005 | Roman |
| 7,604,441 B2 | * | 10/2009 | Bhagath ........................ 407/113 |

(Continued)

FOREIGN PATENT DOCUMENTS

| | | |
|---|---|---|
| EP | 0642859 | 3/1995 |
| GB | 2157989 | 11/1985 |

(Continued)

OTHER PUBLICATIONS

International Search Report dated May 25, 2010 issued in PCT counterpart application (No. PCT/JP2010/055959).

(Continued)

*Primary Examiner* — Will Fridie, Jr.
(74) *Attorney, Agent, or Firm* — Womble Carlyle (57) ABSTRACT

A cutting insert is capable of boring or drilling without the formation of a prepared hole in a workpiece. A cutting edge includes a cutting edge portion extending from the outer peripheral side to the tool center axis side of a cutting tool body when the cutting insert is attached to a mounting seat, reaching a first plane including the tool center axis, and traversing from one side to the other side of a second plane which is perpendicular to the first plane and which includes the tool center axis.

16 Claims, 9 Drawing Sheets

(56) References Cited

U.S. PATENT DOCUMENTS

| | | |
|---|---|---|
| 8,382,403 B2 | 2/2013 | Okumura |
| 8,573,905 B2 * | 11/2013 | Hecht ............... 407/113 |
| 2003/0170079 A1 | 9/2003 | Daiguji et al. |
| 2005/0180825 A1 | 8/2005 | Maier et al. |
| 2007/0059110 A1 | 3/2007 | Choi et al. |
| 2010/0166514 A1 | 7/2010 | Okumura |
| 2011/0305534 A1 | 12/2011 | Park et al. |

FOREIGN PATENT DOCUMENTS

| | | |
|---|---|---|
| JP | H09 290310 A | 11/1997 |
| JP | 2712580 B | 2/1998 |
| JP | S63-39706 | 2/1998 |
| JP | 3438578 B | 8/2003 |
| JP | 3812478 B | 8/2006 |
| JP | 4385519 B | 12/2009 |
| WO | WO 2009/031133 A1 | 3/2009 |

OTHER PUBLICATIONS

Extended European search report issued in European counterpart application (No. 10848957.6) on Jun. 13, 2014.
Official Action dated Jan. 23, 2014 issued in Chinese counterpart application (No. 201080065921.6) with English Translation.
Search Report dated Jan. 23, 2014 issued in Chinese counterpart application (No. 201080065921.6) with English Translation.
Decision on Grant dated Nov. 19, 2013 issued in Russian counterpart application (No. 2012141312)—with English translation.
Office Action dated Dec. 17, 2013 issued in Japanese counterpart applicatin (No. 2012-507997)—with English translation.
International Preliminary Report on Patentability (IPRP) dated Oct. 23, 2012 issued in PCT counterpart application (No. PCT/JP2010/055959) with translation.

* cited by examiner

CUTTING INSERT AND CUTTING TOOL

RELATED APPLICATIONS

This is a Continuation-in-Part of International Application No. PCT/JP2010/055959, filed 31 Mar. 2010 and published as WO 2011/121780A1. The contents of the aforementioned application are incorporated by reference in their entirety.

BACKGROUND OF THE INVENTION

1. Field of the invention

The present invention relates to a cutting insert and a cutting tool provided with the same.

2. Description of the Related Art

Various cutting inserts suitable for boring and drilling have been proposed (See Japanese Patent Nos. 3812478, 2712580, 3438578 and 4385519, for example).

SUMMARY OF INVENTION

Meanwhile, regarding the cutting insert as disclosed in the above-described Japanese Patent Nos. 3812478, 2712580, 3438578 and 4385519, a prepared hole needs to be formed in a workpiece in advance in boring or drilling. Therefore, a request for reduction of the number of processes has been made.

The present invention has been made in view of the above-described problem and has an object to provide a cutting insert and a cutting tool, capable of boring and drilling without forming a prepared hole in a workpiece.

A cutting insert according to the present invention is removably attached to a mounting seat of a cutting tool body, and has a rake face, a flank, and a cutting edge formed at an intersection portion between the rake face and the flank, the cutting edge comprises a first cutting edge portion extending from an outer peripheral side to a tool center axis side of the cutting tool body when the cutting insert is attached to the mounting seat, the first cutting edge portion reaches a first plane including the tool center axis and traverses from one side to the other side of a second plane, and the second plane is perpendicular to the first plane and includes the tool center axis.

Preferably, the rake face includes a first rake face formed on a first surface and a second rake face formed on a second surface; the flank includes a first flank and a second flank formed on a peripheral side surface extending between the first surface and the second surface; the cutting edge includes a first cutting edge formed at an intersection portion between the first rake face and the first flank, and a second cutting edge formed at an intersection portion between the second rake face and the second flank; and the first and second cutting edges include the first cutting edge portions, respectively. Moreover, the first flank and the second flank are formed so as to have positive clearance angles, respectively. Furthermore, the first cutting edge and the second cutting edge have rotational symmetries about at least one axis perpendicular to the center axis of the cutting insert. Furthermore, the first and second cutting edges have corner cutting edge portions formed at corner portions between the first and second surfaces, respectively, and each of the cutting edge portions is continuous from each of the corner cutting edge portions.

More preferably, the first cutting edge portion is inclined in a direction away from a plane perpendicular to the center axis of the cutting insert and passing through the corner portion, as it goes away from the corner cutting edge portion.

A cutting tool according to the present invention has a cutting insert having a rake face, a flank, and a cutting edge formed at an intersection portion between the rake face and the flank, and a cutting tool body having a mounting seat to which the cutting insert is removably attached, the cutting edge comprises a first cutting edge portion extending from an outer peripheral side to a center axis side of the cutting tool body when the cutting insert is attached to the mounting seat, the first cutting edge portion reaches a first plane including the center axis and traverses from one side to the other side of a second plane, and the second plane is perpendicular to the first plane and which includes the center axis.

Preferably, the mounting seat of the cutting tool body is formed so that the cutting insert inclines in first and second directions perpendicular to each other so as to further ensure a clearance between the cutting insert attached to the mounting seat and a workpiece.

According to the present invention, boring or drilling can be performed without forming a prepared hole, and the number of machining processes can be reduced.

DETAILED DESCRIPTION

An embodiment of the present invention will be described below by referring to FIGS. 1 to 9.

Figure 1:
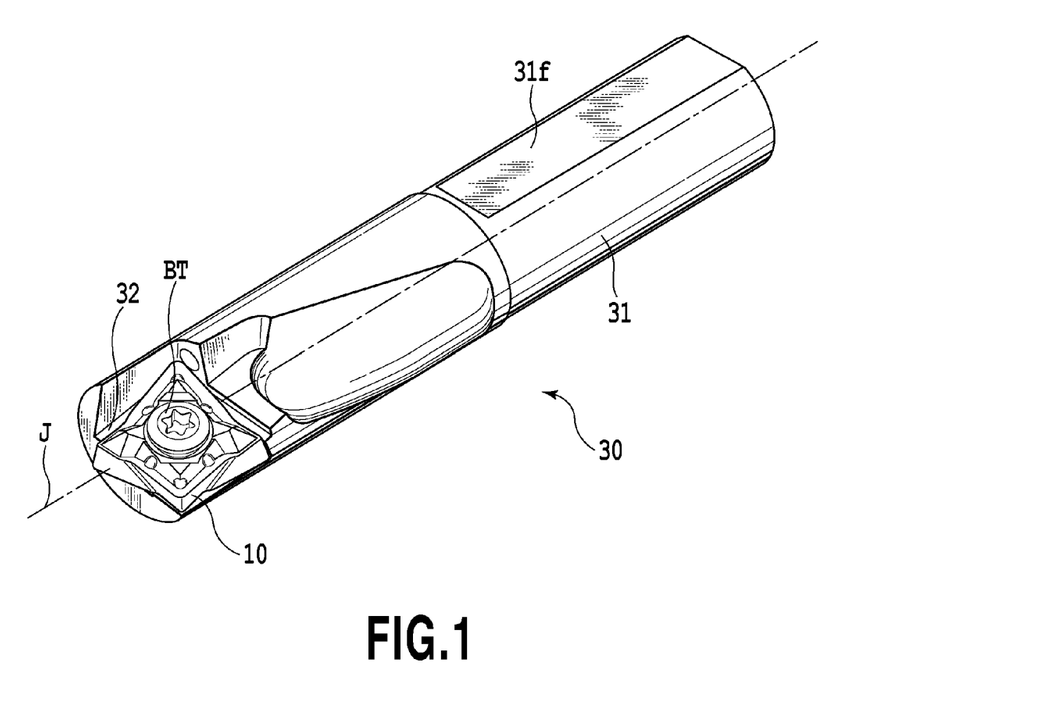
FIG. 1 is a perspective view of a cutting tool according to an embodiment of the present invention.
Figure 2:
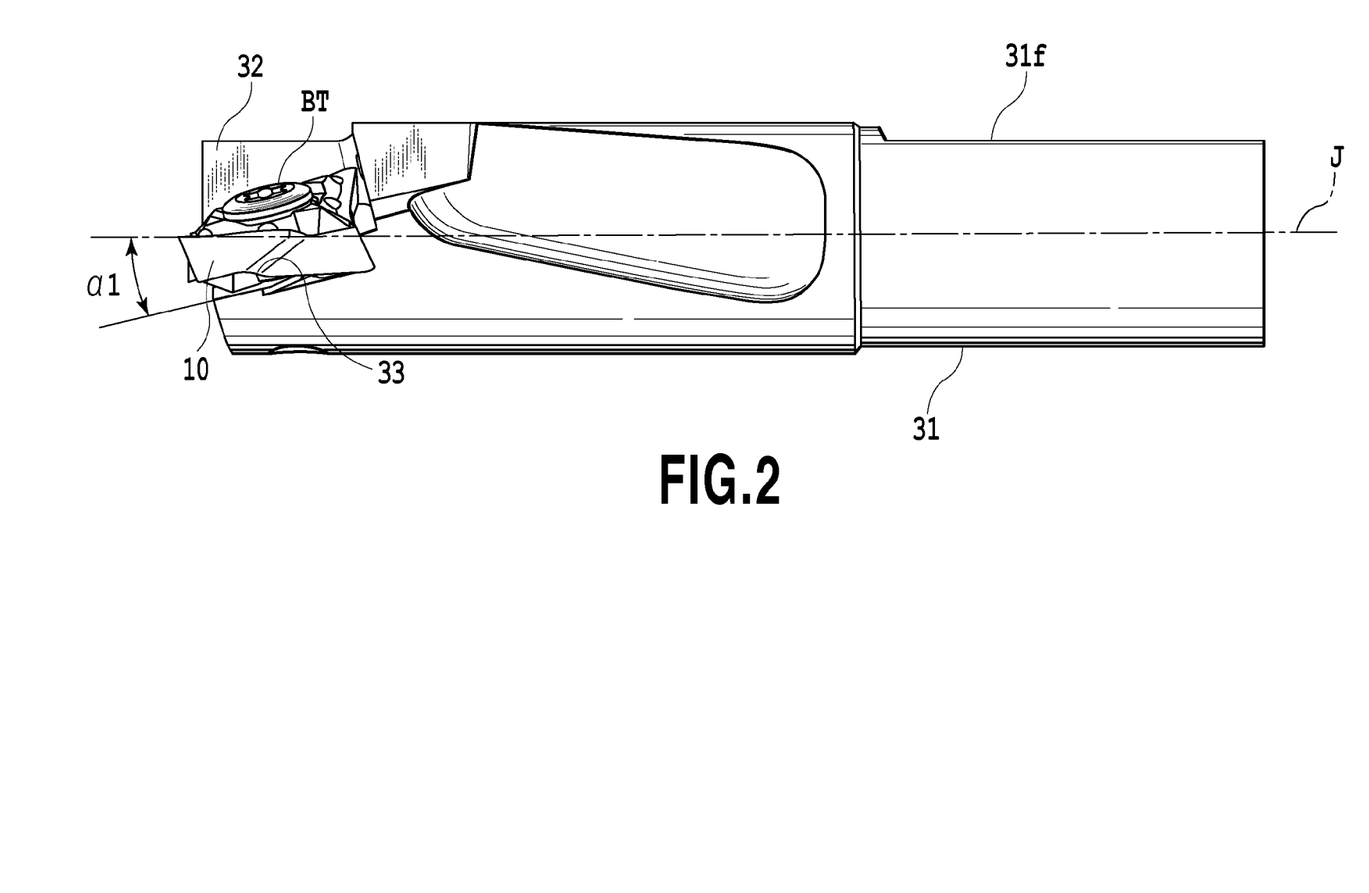
FIG. 2 is a side view of the cutting tool in FIG. 1.
Figure 3:
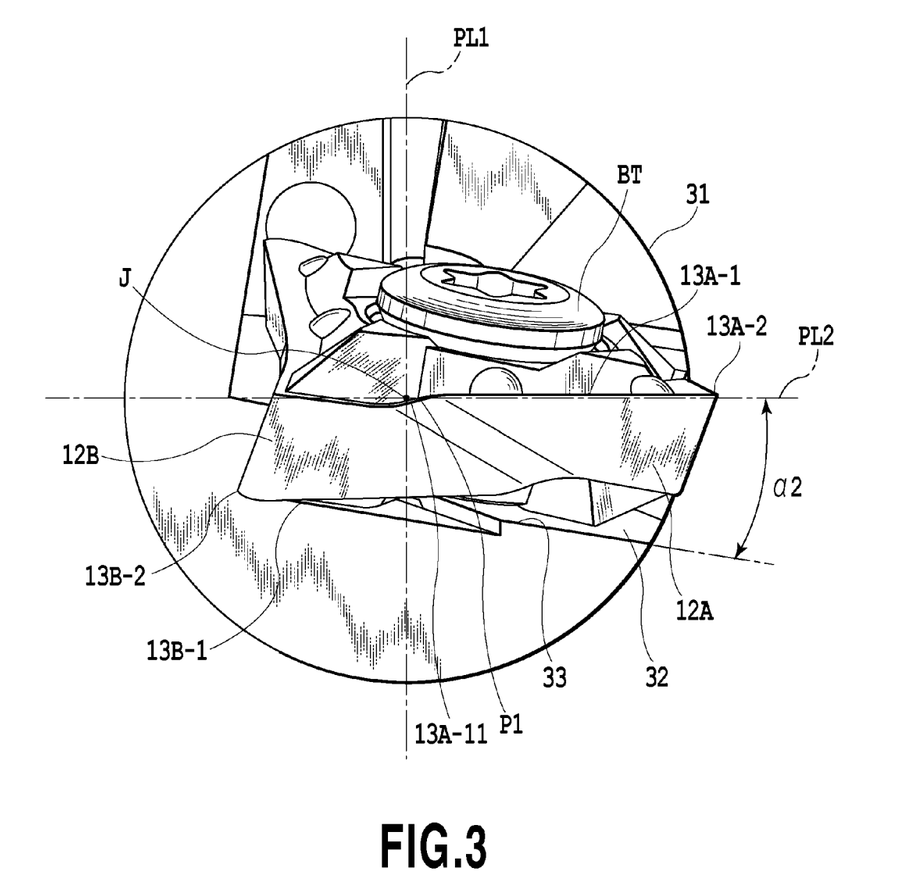
FIG. 3 is a view of the cutting tool in FIG. 1 seen from a direction of a tool center axis.

A cutting tool 30 illustrated in FIGS. 1 to 3 includes a cutting tool body 31 and a cutting insert 10. Regarding this cutting tool 30, a workpiece positioned on a reference surface perpendicular to a tool center axis J of the cutting tool 30 is cut and machined by a cutting insert 10 through the rotation of the workpiece. Meanwhile, a user can attach the cutting tool 30 to a main shaft of a machine tool such as a machining center and by rotating that around the tool center axis J so as to machine the workpiece without rotating the workpiece.

Regarding a cutting tool body 31 of the cutting tool 30, the cutting tool body 31 is formed having a cylindrical shape and has a mounting seat 32 on the distal end portion side thereof and a reference surface 31f which is perpendicular to a reference surface perpendicular to the above-described tool center axis J and which is in parallel with the tool center axis J on the base end portion side. The cutting insert 10 is attached to the mounting seat 32. The cutting insert 10 is fixed to the cutting tool body 31 by a bolt BT. A structure of the mounting seat 32 will be described later.

The cutting insert 10 is formed of a material such as, for example, cemented carbide. This cutting insert 10 is, as illustrated in FIGS. 4 to 7, a plate-like member having an approximately square outer shape. This cutting insert 10 has a central through-hole 16 formed concentrically to an insert center axis K for inserting the bolt BT therethrough and fixing the cutting insert 10 to the cutting tool body 31.

Figure 4:
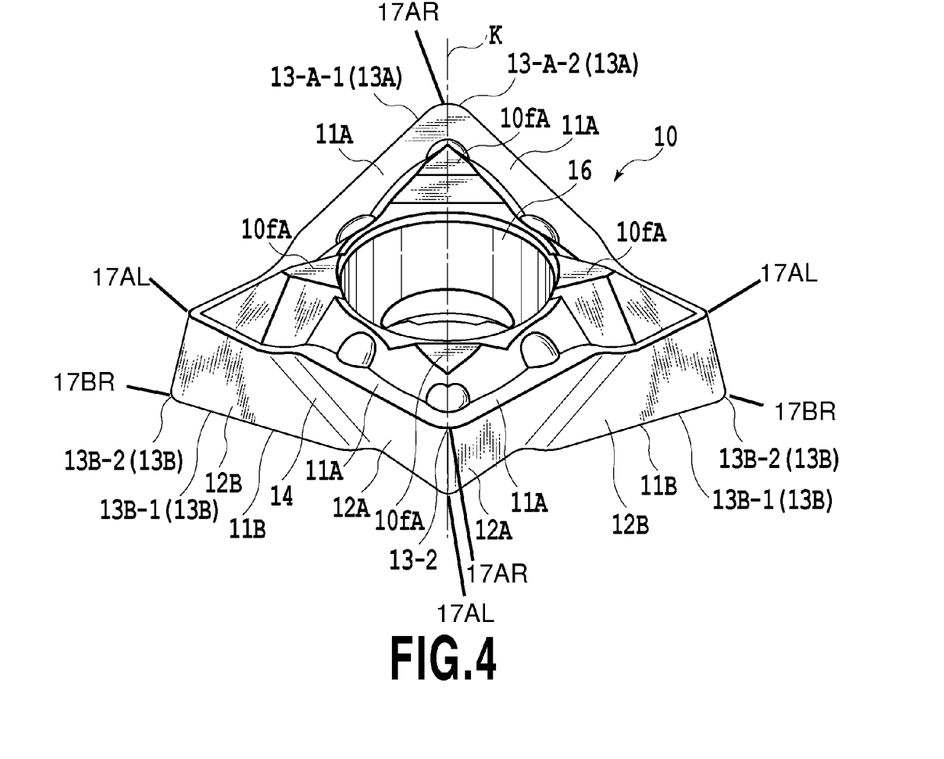
FIG. 4 is a perspective view of a cutting insert of an embodiment according to the embodiment of the present invention.
Figure 5:
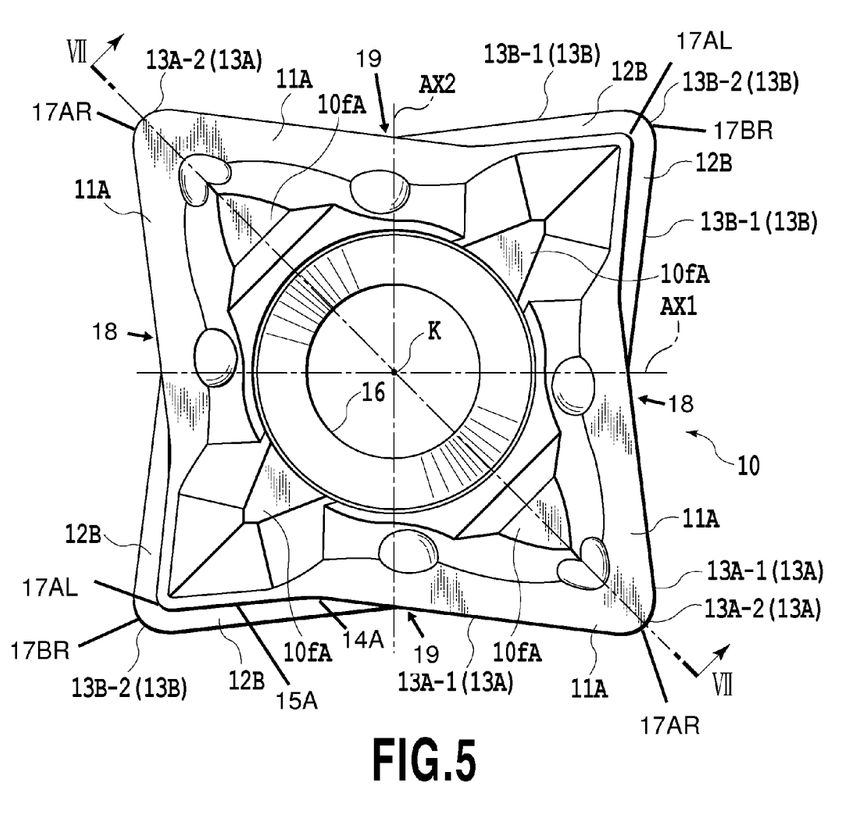
FIG. 5 is a plan view of the cutting insert in FIG. 4.
Figure 6:
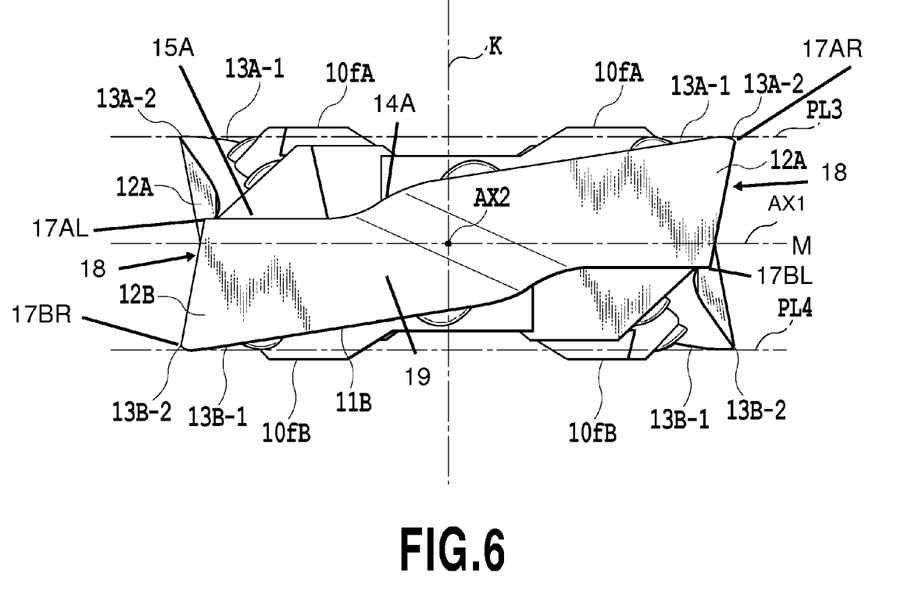
FIG. 6 is a side view of the cutting insert in FIG. 4.
Figure 7:
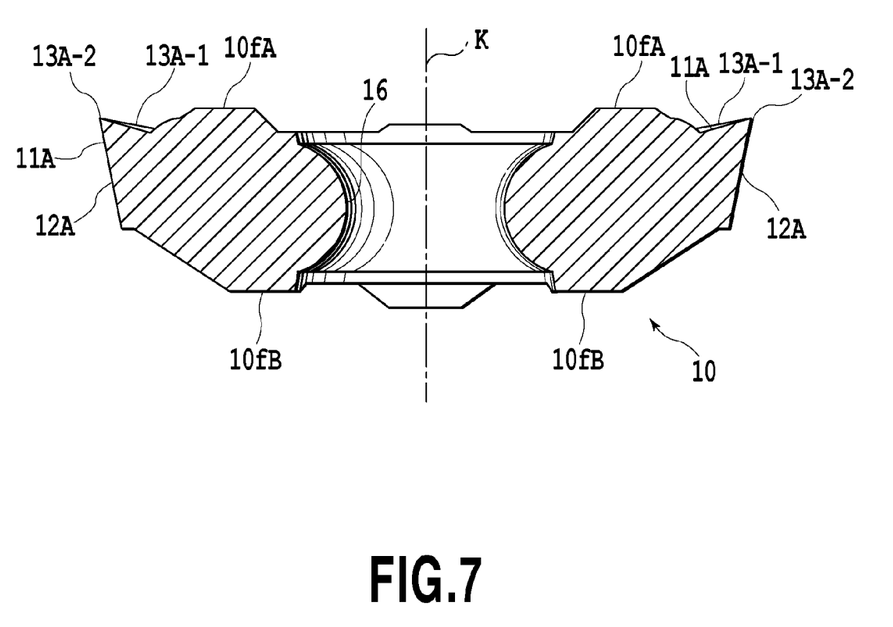
FIG. 7 is a cross-sectional view in VII-VII line direction in FIG. 5.

On a top surface (first surface) of the cutting insert 10, a planar top reference surface 10*f*A perpendicular to the insert center axis K and an upper rake face (first rake face) 11A are formed. On a bottom surface (second surface) of the cutting insert 10, a planar bottom reference surface 10*f*B perpendicular to the insert center axis K and a lower rake face (second rake face) 11B are formed. The planar reference surfaces 10*f*A, 10*f*B may serve as insert abutment surfaces for seating the cutting insert 10 on the mounting seat 32 of a tool body. As seen in FIGS. 4-6, the top surface has two diametrically opposite raised corners 17AR and two diametrically opposite lower corners 17AL. Similarly, the bottom surface also has two diametrically opposite raised corners 17BR and two diametrically opposite lower corners 17BL.

A peripheral side surface extending between the top surface and the bottom surface of the cutting insert 10 includes a first pair 18 of opposing side surfaces and a second pair of opposing side surfaces 19. On the peripheral side surface, an upper flank (first flank 12A) intersecting with the upper rake face 11A and a lower flank (second flank) 12B intersecting with the lower rake face 11B are formed. The upper flank 12A and the lower flank 12B are formed so as to have positive clearance angles, respectively. The upper flank 12A extends from the upper rake face 11A to the bottom surface, while the lower flank 12B extends from the lower rake face 11B to the top surface.

An upper cutting edge (first cutting edge) 13A is formed at an intersection portion between the upper rake face 11A and the upper flank 12A. A lower cutting edge (second cutting edge) 13B is formed at an intersection portion between the lower rake face 11B and the lower flank 12B.

The upper cutting edge 13A is, as illustrated in FIG. 3, includes an upper cutting edge portion 13A_1 extending from the outer peripheral side to the tool center axis J side, of the cutting tool body 31 in a state attached to the mounting seat 32 of the cutting tool body 31. Moreover, the upper cutting edge portion 13A has an upper corner cutting edge portion 13A_2 formed at two corner portions of the top surface, and this upper corner cutting edge portion 13A_2 is continuous with the upper cutting edge portion 13A_1.

The upper cutting edge portion 13A_1 reaches a first plane PL1 including the tool center axis J, traverses from one side to the other of a second plane PL2 perpendicular to the first plane PL1 and including the tool center axis J. Specifically, as illustrated in FIG. 3, the upper cutting edge portion 13A_1 extends approximately parallel on one side of the second plane PL2 from the upper corner cutting edge portion 13A_2 side to the tool center axis side J. Then, at a position P1 close to the tool center axis J, intersects with the second plane PL2, and reaches the first plane PL1 on the other side of the second plane PL2. That is, as illustrated in FIG. 3, when the cutting insert 10 is attached to the cutting tool body 31, a part of the upper cutting edge portion 13A_1 is formed so as to pass below the tool center axis J.

Moreover, the upper cutting edge portion 13A_1 is, as illustrated in FIG. 6 showing the top view of the cutting insert, inclined in a direction away from a plane PL3 perpendicular to the tool center axis J of the cutting insert 10 and passing through the upper corner cutting edge portion 13A_2, as it goes away from the upper corner cutting edge portion 13A_2.

Furthermore, the upper cutting edge 13A is rotationally symmetric by 180 degrees with respect to the insert center axis K.

In the side view of FIG. 6, the upper cutting edge portion 13A-1 is inclined towards the median plane M at a first downward angle, from the raised corner 17AR of the top surface to past the central insert axis K. Then, a transition cutting edge portion 14A is inclined towards the median plane M at a transition angle which is greater than the first downward angle, from the upper cutting edge portion 13A-1. Finally, a non-cutting edge portion 15 extends from the transition cutting edge portion to the lower corner 17AL of the top surface. Meanwhile, in the top view of FIG. 5, the upper cutting edge portion 13A-1 is angled in an inward direction of the cutting insert from the raised corner 17AR of the top surface to the transition portion 14A; and the non-cutting edge portion 15A is angled in an inward direction of the insert from the lower corner 17AL of the top surface to the transition portion 14A.

The lower cutting edge 13B is configured in the same manner as the upper cutting edge 13A and includes a lower cutting edge portion 13B_1 corresponding to the upper cutting edge portion 13A_1 and a lower corner cutting edge portion 13B_2 corresponding to the upper corner cutting edge portion 13A_2. Then, the lower cutting edge portion 13B_1 is, as illustrated in FIG. 6, inclined in a direction away from a plane PL4 perpendicular to the tool center axis J of the cutting insert 10 and passing through the lower corner cutting edge portion 13B_2, as it goes away from the lower corner cutting edge portion 13B_2. Furthermore, the lower cutting edge 13B is rotationally symmetric by 180 degrees about the insert center axis K.

Moreover, the upper cutting edge 13A and the lower cutting edge 13B are rotationally symmetric by 180 degrees about a first axis AX1 and a second axis AX2, the first axis AX1 passing through a first pair of opposing side surfaces 18 and the second axis AX2 passing through a second pair 19 of opposing side surfaces of the peripheral side surface. Here, the first axis AX1 and the second axis AX2 are perpendicular to each other and are included in a median plane M passing through the middle between a planar top reference surface 10*f*A on the top surface and a planar bottom reference surface 10*f*B on a bottom surface. That is, the first axis AX1 and the axis second AX2 are perpendicular to the insert center axis K.

The upper cutting edge 13A and the lower cutting edge 13B are rotationally symmetric by 180 degrees about the first axis AX1 and the second axis AX2.

A tool user can use both of the two upper corner cutting edge portions 13A-2 of the upper cutting edge 13A by rotating the cutting insert 10 configured as above by 180 degrees with respect to the mounting seat 32. Moreover, the user can use both of the two lower corner cutting edge portions 13B-2 by rotating the cutting insert 10 by 180 degrees about the first axis AX1 or the second axis AX2 with respect to the mounting seat 32. That is, in the cutting insert 10, its flanks 12A and 12B have positive clearance angles, but four corner cutting edge portions 13A_2 and 13B_2 are used.

Moreover, a mounting seat face 33 of the mounting seat 32 in the cutting tool body 31 is, as illustrated in FIG. 2, inclined only by a first seating angle α1 with respect to the tool center axis J in a plane including the tool center axis J and perpendicular to the reference surface 31*f* of the cutting tool body 31 so that a clearance between the cutting insert 10 attached to the mounting seat 32 and the workpiece is further ensured. Moreover, the mounting seat face 33 is, as illustrated in FIG. 3, inclined only by a second seating angle α2 with respect to the second plane PL2 in a plane perpendicular to the tool center axis J.

Subsequently, machining using the cutting tool configured as above will be described by referring to FIGS. 8 and 9.

Figure 8:
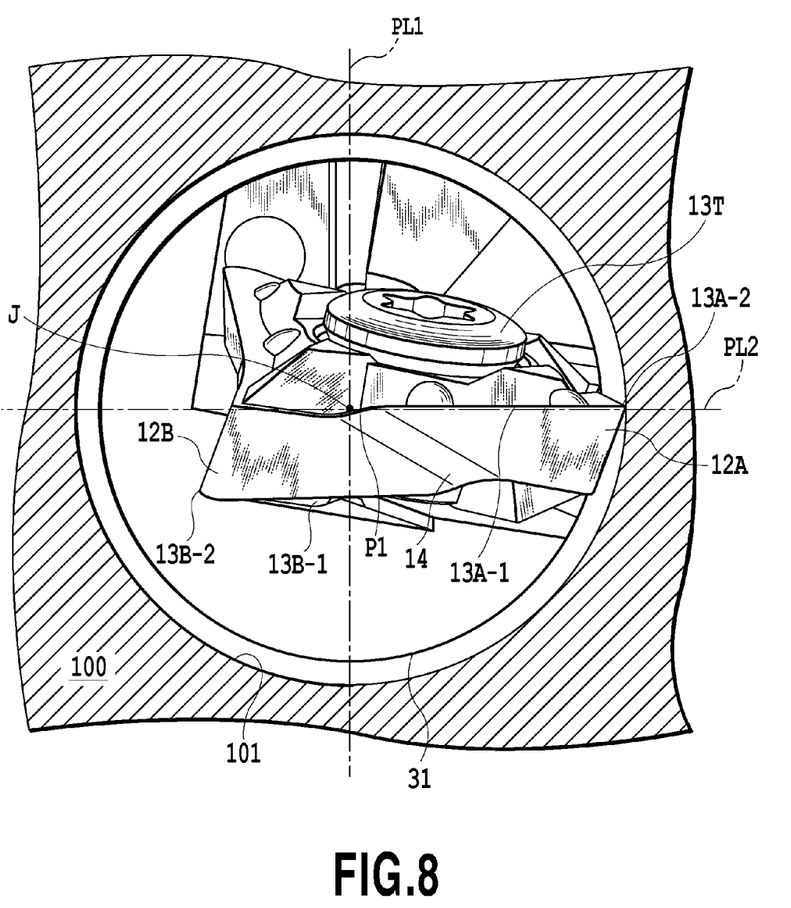
FIG. 8 is a view illustrating a relationship between a machined hole and the cutting insert and a view of the cutting tool partially including a section of a workpiece when seen from the direction of the tool center axis.
Figure 9:
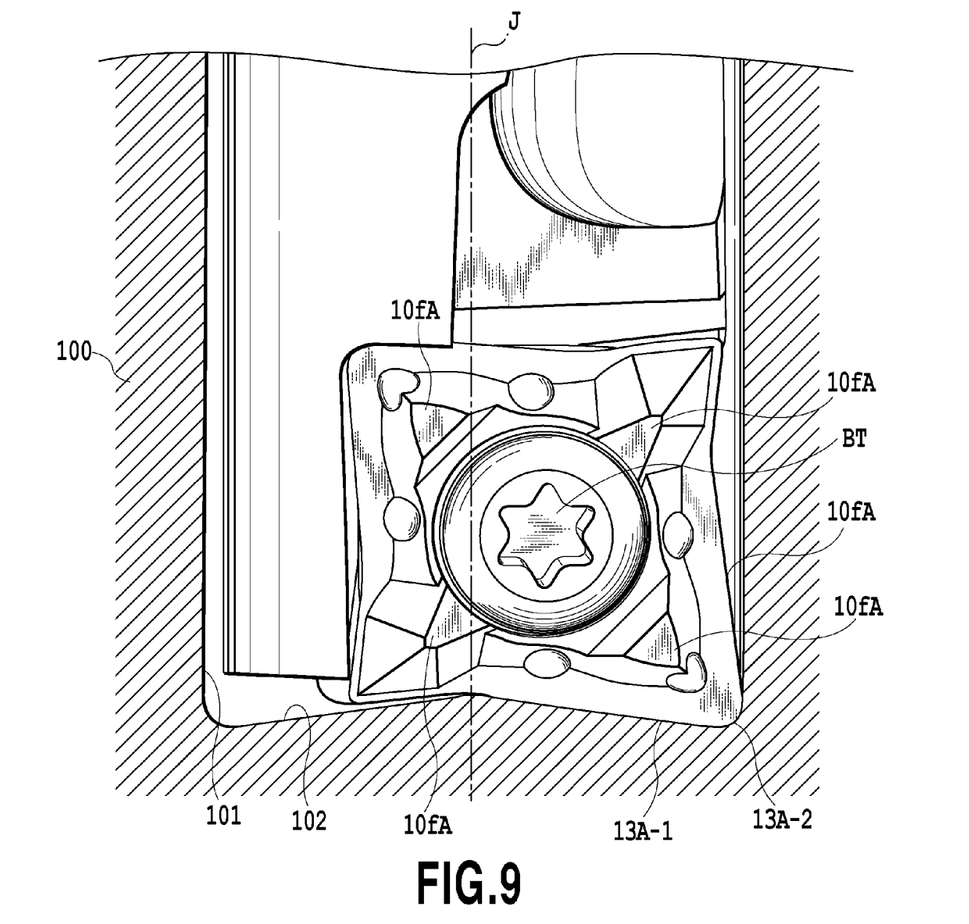
FIG. 9 is a view illustrating a relationship between the machined hole and the cutting insert and a view of the section of a workpiece and the cutting tool when seen from above the cutting insert.

In FIGS. 8 and 9, a prepared hole is not formed in a workpiece 100, but when cutting progresses in the direction of the tool center axis J by boring through turning of the cutting insert 10 attached to the cutting tool body 31, a portion positioned below the rotation/tool center axis J in the upper cutting edge 13A_1 functions as a central edge, and a machined hole 101 is machined. An inner peripheral face of the machined hole 101 is cut by the upper corner cutting edge portion 13A_2. A bottom portion 102 of the machined hole 101 is cut in the conical shape by the upper cutting edge portion 13A_1.

As described above, according to the cutting tool according to this embodiment, since the machined hole 101 can be machined without the formation of a prepared hole, the number of processes in boring or drilling is reduced.

In the above-described embodiment, the case where the cutting insert 10 is rotationally symmetric by 180 degrees with respect to the insert center axis K has been described. However, the embodiment is not limited to the case, and the case may not have rotational symmetry. Moreover, the case where the upper and lower cutting edges of the cutting insert 10 have rotational symmetries with respect to the first and second axes AX1 and AX2 has been described, but the present invention can be applied also to a case of rotational symmetry with respect only to one axis or to a case not having rotational symmetry.

In the above-described embodiment, the case has been described as an example, where shape of the cutting edge is inclined so as to extend in parallel with the periphery of the plane PL2 up to the periphery of the tool center axis J and so as to pass below the tool center axis J in the periphery of the tool center axis J. However, the present invention is not limited to that. For example, the shape of the cutting edge may be such that it extends from the outer peripheral side to the tool center axis J side in a direction away from the plane PL2 and then, changes its direction and extends toward the plane PL2 and finally, passes below the tool center axis J.

The cutting insert and the cutting tool according to the present invention can be applied to drilling and boring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cutting tool having a tool center axis (J), the tool comprising:
  a cutting insert having a rake face, a flank, and a cutting edge formed at an intersection portion between the rake face and the flank, and
  a cutting tool body having a mounting seat to which the cutting insert is removably attached, wherein in a front view of the tool along the tool center axis:
  a first plane (PL1) includes the tool center axis and passes through the cutting insert and the mounting seat,
  a second plane (PL2) includes the tool center axis, passes through the cutting insert and is perpendicular to the first plane,
  the cutting edge comprises a cutting edge portion extending from an outer peripheral side to a tool center axis side of the cutting tool body when the cutting insert is attached to the mounting seat, and
  the cutting edge portion reaches the first plane and traverses from the one side of the second plane to the other side of the second plane.

2. The cutting tool according to claim 1, wherein
  the mounting seat of the cutting tool body is formed so that the cutting insert inclines in first and second directions perpendicular to each other so as to further ensure a clearance between the cutting insert attached to the mounting seat and a workpiece.

3. An indexable cutting insert, comprising:
  generally square-shape top and bottom surfaces connected by four side surfaces, each of the top and bottom surfaces having two diametrically opposite raised corners and two diametrically opposite lower corners;
  a central through-hole passing between the top and bottom surfaces and having an insert central axis around which the cutting insert has 180° rotational symmetry;
  a first axis passing through a first pair of opposing side surfaces and a second axis passing through a second pair of opposing side surfaces and intersecting the first axis, the first and second axes being perpendicular to one another and also to the insert central axis, the first axis and second axis being included in a median plane passing in middle of the insert between the top and bottom surfaces, the cutting insert having 180° rotational symmetry about at least one of the first axis and the second axis;
  each member of the first pair of side surfaces having an upper flank adjacent to the top surface and a lower flank adjacent to the bottom surface;
  an upper cutting edge formed at an intersection portion between the upper flank and a upper rake face, the upper cutting edge including an upper cutting edge portion;
  wherein:
  in a side view of the cutting insert:
    the upper cutting edge portion is inclined towards the median plane at a first downward angle, from the raised corner of the top surface to past the central insert axis;
    a transition cutting edge portion is then inclined towards the median plane at a transition angle which is greater than the first downward angle, from the upper cutting edge portion; and
    a non-cutting edge portion extends from the transition cutting edge portion to the lower corner of the top surface; and
  in a top view of the cutting insert:
    the upper cutting edge portion is angled in an inward direction of the insert from the raised corner of the top surface upper to the transition portion; and
    the non-cutting edge portion is angled in an inward direction of the insert from the lower corner of the top surface to the transition portion.

4. The indexable cutting insert according to claim 3, wherein:
  the cutting insert has 180° rotational symmetry about both the first axis and the second axis.

5. The indexable cutting insert according to claim 4, wherein:
  in the side view, the non-cutting edge portion is substantially parallel to the median plane.

6. The indexable cutting insert according to claim 3, wherein:
  in the side view, the non-cutting edge portion is substantially parallel to the median plane.

7. The indexable cutting insert according to claim 3, wherein:

each of the top and bottom surfaces has a planar reference surface which is parallel to the median plane and farther from the median plane than the associated raised corners.

8. A cutting tool comprising:
a cutting tool body having a mounting seat; and
a cutting insert in accordance with claim 3 removably attached to the mounting seat.

9. The cutting tool according to claim 8, wherein:
the mounting seat is formed so that the cutting insert inclines in first and second directions perpendicular to each other so as to further ensure a clearance between the cutting insert attached to the mounting seat and a workpiece.

10. The cutting tool according to claim 8, wherein:
the cutting tool has a tool center axis (J); and
in a front view of the tool along the tool center axis:
a first plane (PL1) includes the tool center axis and passes through the cutting insert and the mounting seat,
a second plane (PL2) includes the tool center axis, passes through the cutting insert and is perpendicular to the first plane,
an operative cutting edge comprises a cutting edge portion extending from an outer peripheral side to a tool center axis side of the cutting tool body when the cutting insert is attached to the mounting seat, and
the cutting edge portion reaches the first plane and traverses from the one side of the second plane to the other side of the second plane.

11. The cutting tool according to claim 10, wherein:
the cutting tool is rotatable about the tool center axis (J).

12. The cutting tool according to claim 1, wherein:
the cutting tool is rotatable about the tool center axis (J).

13. A double-sided indexable cutting insert having an insert center axis (K) around which the cutting insert is indexable, the cutting insert comprising:
a top first surface and a bottom second surface;
a first rake face formed on the top first surface and a second rake face formed on the bottom second surface;
a median plane between the top first surface and the bottom second surface;
a peripheral side surface comprising a first pair of opposing side surfaces and a second pair of opposing side surfaces;
each member of the first pair of side surfaces extending between the top first surface and the bottom second surface, and having a first flank and a second flank;
each member of the first pair of side surfaces having a first cutting edge formed at an intersection portion between the first rake face and the first flank and a second cutting edge formed at an intersection portion between the second rake face and the second flank;
the first cutting edge and the second cutting edge having rotational symmetry about an axis perpendicular to the insert center axis;
the first cutting edge and the second cutting edge having corner cutting edge portions formed at corner portions of the top first surfaces and bottom second surface; and
each cutting edge comprising a cutting edge portion which extends from the corner cutting edge portion, slopes in the direction of the median plane and connects to a non-cutting edge portion via a transition cutting edge portion, the non-cutting edge portion being closer to the median plane than the cutting edge portion and extending to a lowered corner.

14. A cutting tool comprising:
a cutting tool body having a mounting seat; and
a cutting insert in accordance with claim 13 removably attached to the mounting seat.

15. The cutting tool according to claim 14, wherein:
the cutting tool has a tool center axis (J); and
in a front view of the tool along the tool center axis:
a first plane (PL1) includes the tool center axis and passes through the cutting insert and the mounting seat,
a second plane (PL2) includes the tool center axis, passes through the cutting insert and is perpendicular to the first plane,
an operative cutting edge comprises a cutting edge portion from an outer peripheral side to a tool center axis side of the cutting tool body when the cutting insert is attached to the mounting seat, and
the cutting edge portion reaches the first plane and traverses from the one side of the second plane to the other side of the second plane.

16. The cutting tool according to claim 15, wherein:
the cutting tool is rotatable about the tool center axis (J).

* * * * *